Figure 1:
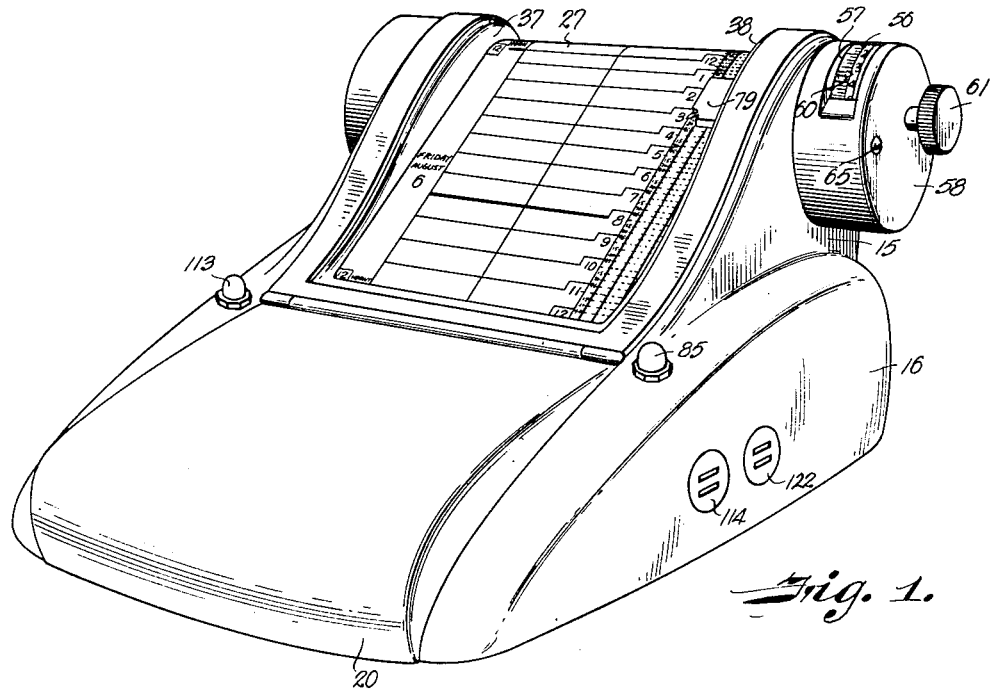

May 8, 1951   R. D. SCHNEE   2,551,707
CHRONOMETRIC DISPLAY AND CONTROL DEVICE
Filed Feb. 27, 1947   4 Sheets-Sheet 1

Inventor
Russell D. Schnee
By Thos. E. Arfield
Attorney

May 8, 1951  R. D. SCHNEE  2,551,707
CHRONOMETRIC DISPLAY AND CONTROL DEVICE
Filed Feb. 27, 1947  4 Sheets-Sheet 2

Inventor
Russell D. Schnee
By Thos. E. Anfield
Attorney

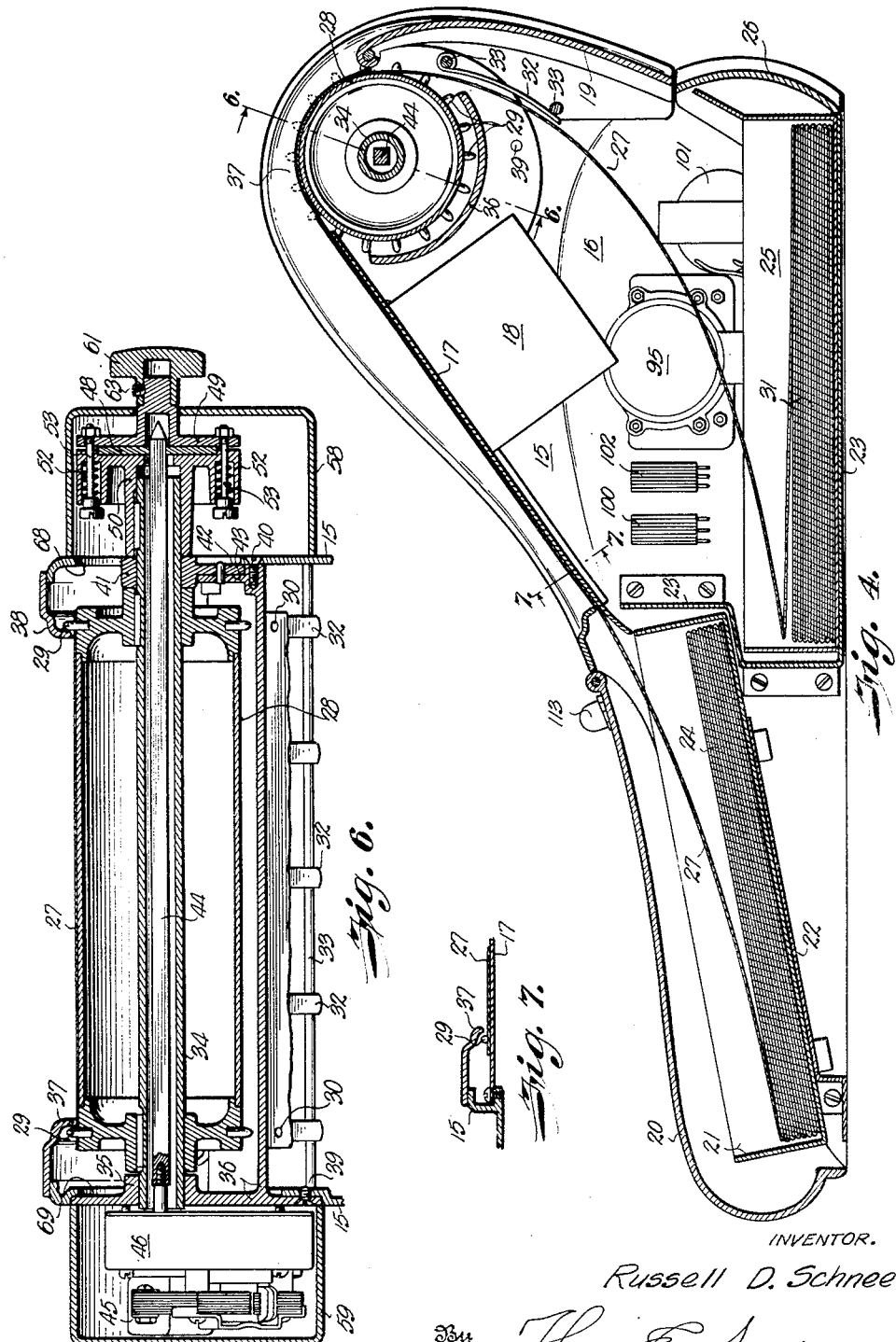

May 8, 1951 R. D. SCHNEE 2,551,707
CHRONOMETRIC DISPLAY AND CONTROL DEVICE
Filed Feb. 27, 1947 4 Sheets-Sheet 4

Inventor
Russell D. Schnee
By Thos. E. Anfield
Attorney

Patented May 8, 1951

2,551,707

UNITED STATES PATENT OFFICE 2,551,707

CHRONOMETRIC DISPLAY AND CONTROL DEVICE

Russell D. Schnee, Kansas City, Mo., assignor of one-half to William J. Helm, Kansas City, Mo.

Application February 27, 1947, Serial No. 731,394

3 Claims. (Cl. 271—2.1)

1

The present invention relates in general to time-controlled apparatus and more particularly to apparatus for displaying information and/or performing desired signal or control operations at times previously scheduled.

In many professions as well as in many fields of business, industry, service and research it is essential or advantageous to schedule events well in advance of their happening, in order that the events may take place in an orderly fashion as parts of a coordinated and integrated program. Broadly speaking, it is the object of the present invention to provide apparatus which will prompt a human agent as to these events in their proper order and at the proper time, or which will directly control the happening of the events themselves, or both.

Further, it is the object of the invention to provide a unit of this kind which is compact yet which permits convenient scheduling of events in any desired way on either a cyclic or noncyclic basis for very long periods of time in advance.

Another object is to provide an improved form of scheduling medium and an improved storage and indexing arrangement therefor.

Still another object is to provide means for transmitting signal and control impulses, which means is adapted to permit the beginning and end of each impulse to be positioned in time with complete freedom, irrespective of the position in time of the beginning or ending of any other impulse, so, for example that successive impulses in an impulse train may be of the same or different length and so that the spacing between successive pairs of impulses may be of the same or different length.

In keeping with these and other objects there is provided an elongated control strip or tape adapted to be scanned or sensed on a time basis. Different columns are provided along the length of the strip, together with means for producing effects differing in accordance with the column in which control elements or marks are positioned; moreover, means are provided for producing different effects under the control of different elements or marks in the same column.

Arrangements are provided for controlling remote apparatus with my unit, and for this purpose electrical impulses are generated, the character and timing of each impulse being determined by a single control element or mark on the strip in certain cases and being determined conjointly by a plurality of said elements or marks on the strip in other cases. An auxiliary control over said impulses also is provided, supplement-

2 ing the control exercised by the elements or marks on the strip.

To facilitate the advance scheduling of future happenings, the strip is accordion folded in storage, whereby all parts thereof are readily accessible; moreover, the folds are indexed with convenient reference legends. Time controlled apparatus is provided to unfold the strip progressively from one storage receptacle and transfer it to another where it is refolded. Both storage receptacles are concealed from view but the intermediate unfolded portion of the strip is exposed to form a bulletin of current events; and it is this portion of the strip which also is sensed for control and signalling purposes.

A number of mechanical features are embodied in my apparatus, particularly in connection with the construction of the mechanism which advances the strip, and these as well as other objects and features not specifically enumerated hereinbefore will appear in the course of the following description of the invention.

Figure 2:
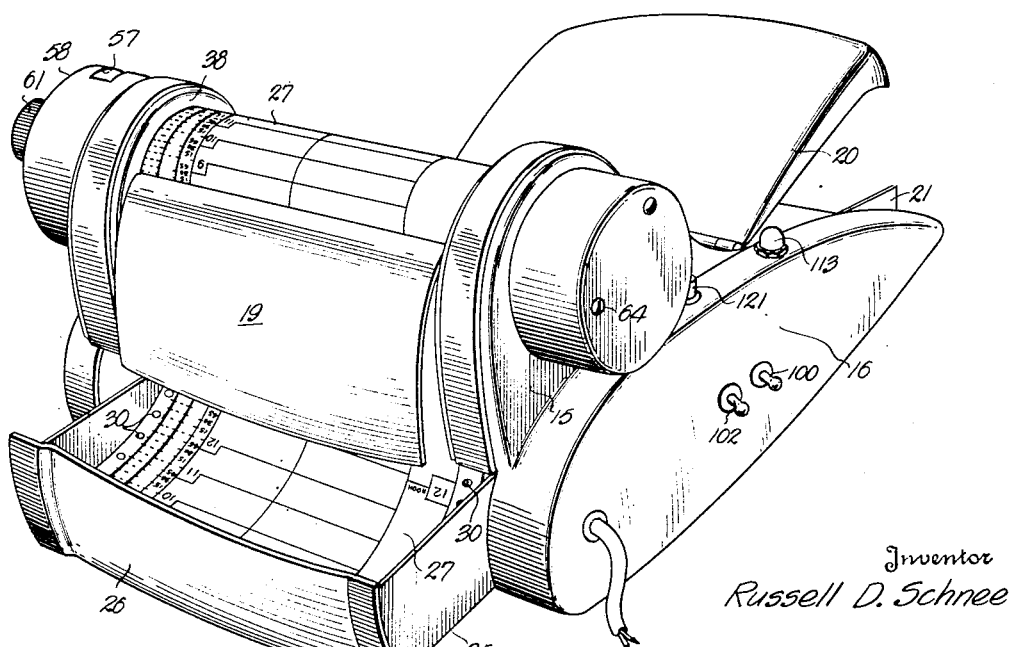
Figures 3, 5:
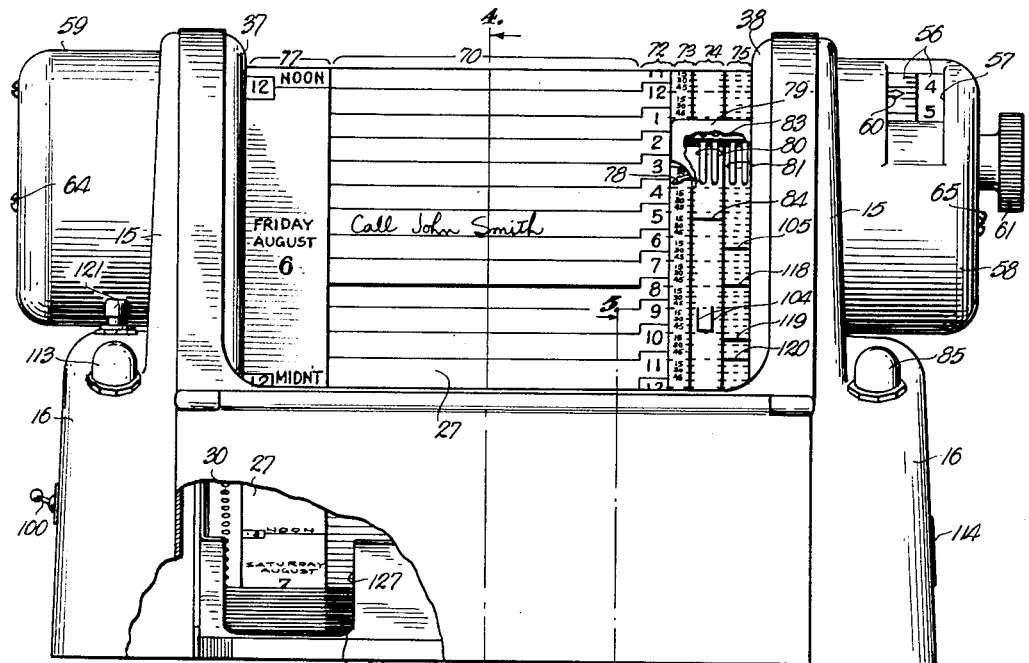
Figure 8:
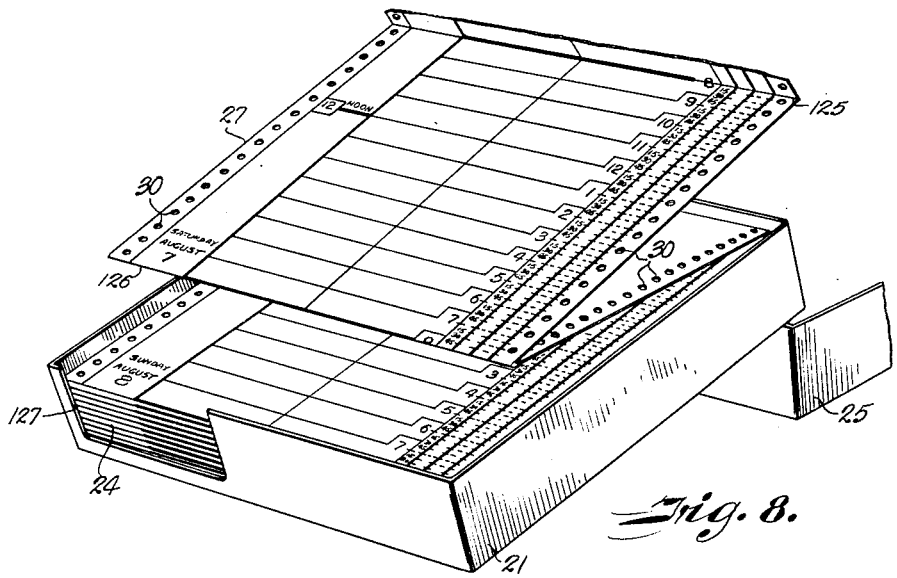
Figure 9:
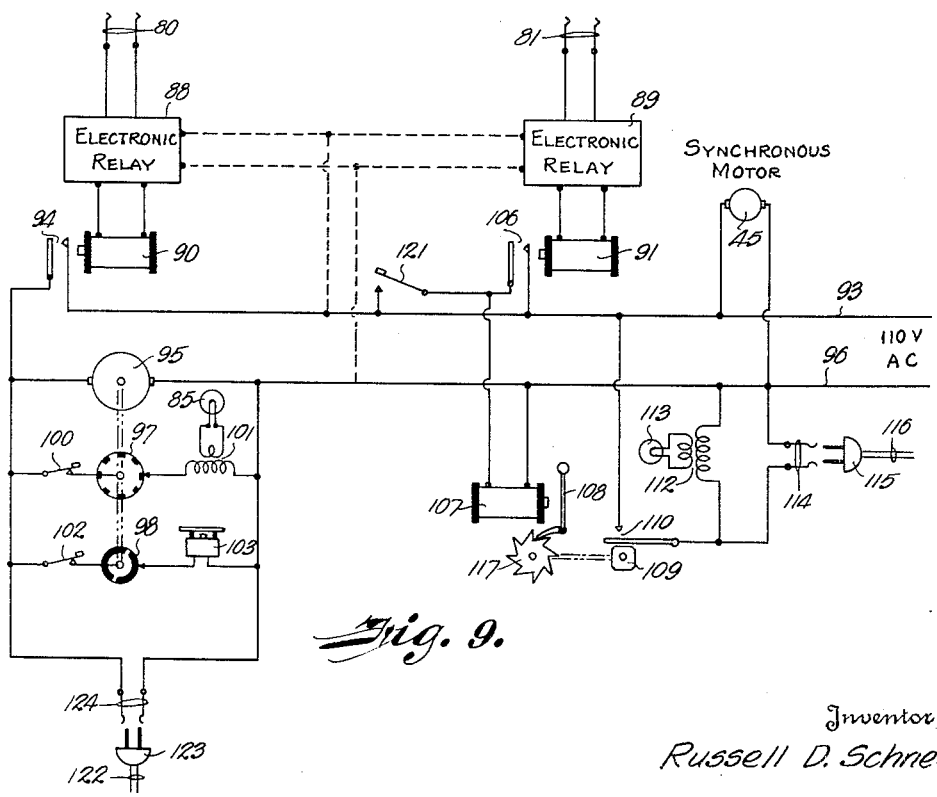

In the accompanying drawings which form a part of the specification and are to be read in conjunction therewith and in which like reference characters indicate like parts of the various views, Fig. 1 is a front perspective view of a preferred form of chronometric display and control unit embodying the invention, Fig. 2 is a rear perspective view of the unit showing the front and rear covers slightly raised and the rear drawer drawn slightly outward, Fig. 3 is an elevational view of the front of the unit, illustrating how memoranda and "trigger" marks are entered on the strip, Fig. 4 is a cross sectional view taken along the line 4—4 of Fig. 3 in the direction of the arrows, Fig. 5 is a fragmentary cross sectional view taken along the line 5—5 of Fig. 3 in the direction of the arrows, Fig. 6 is a cross sectional view taken along the line 6—6 of Fig. 4 in the direction of the arrows, Fig. 7 is a fragmentary cross sectional view taken along the line 7—7 of Fig. 4 in the direction of the arrows, Fig. 8 is a perspective view illustrating the manner in which the accordion folded strip is stored in the machine, and Fig. 9 is a schematic circuit diagram of the apparatus.

Referring now more in detail to the drawings, the casing of my unit has a pair of spaced-apart side walls 15 arranged on a laterally extending hollow base 16, the configuration and relationship of these parts being readily apparent from Figs. 1, 2 and 3. Between the side walls and supported by them in the manner illustrated in Fig. 7 is an inclined table 17. An elongated rectangular box 18 is fastened crosswise of the table to the underside thereof, whereby it extends substantially from one side wall to the other; this box contains a pair of electromagnetic relays and electronic equipment for operating same, the purpose of which will be made clear presently.

At the foot of the inclined table, covered by a hinged door 20, is a shallow rectangular tray 21. The tray is supported in an inclined position by a pair of frames 22 and 23 so its rear edge is above the forward edge of a similar tray 25. The latter tray is supported by the lower horizontal portion of frame 23 and, together with the curved back member 26 fastened thereto, it forms a drawer which is adapted to be drawn rearwardly out of the casing in the manner illustrated in Fig. 2. Fig. 2 also indicates how the hinged door 20 may be raised to give access to the forward tray 21, and it will be understood that the tray is removable through the open door.

The forward tray serves as a storage receptacle for a long strip 27 of paper or like material which is accordion folded to form a compact rectangular pack 24. A portion of the strip, unfolded from the top of the pack, extends upwardly across the face of the inclined table 17 over a roller or drum 28 and downwardly into the rear tray. The roller is driven slowly at a constant speed as will be explained hereinafter, and at its opposite ends it has sprocket pins 29 which cooperate with spaced holes 30 along the longitudinal margins of the strip thereby to draw the strip slowly from the forward tray and deposit it in the rear tray where, due to the inherent stiffness of the paper and the transverse creases preformed therein, it automatically refolds into a neat pack 31. The refolding is facilitated by curved fingers 32 supported on the cross rods 33, these fingers serving to guide the strip from the roller and direct it toward the rear tray. In order to thread the leading end of the strip through the machine in front of these fingers when the machine initially is put in service, the rear cover 19 is hinged at its upper edge so it may be raised, see Fig. 2, to gain access to the strip at the point where it descends behind the roller. As the strip advances across table 17 it will be noted that it is maintained flat by the overhanging flanges 37 and 38 on the side walls.

Turning now to Fig. 6, the construction and assembly of the strip-advancing mechanism will be described in detail. The roller or drum 28 is keyed to a hollow shaft 34, one end of which is journaled in a bearing 35 in the frame 36. This frame has a segmento-cylindrical section extending underneath the roller from one wall 15 to the other, and it is secured to the opposite walls by means of screws 39 and 40. The other end of the hollow shaft 34 is journaled in a bearing 41 which has a flange 42 removably secured by means of screws and/or pins, as shown, to a flange 43 on the frame 36.

Within the hollow shaft is a square shaft 44 driven by a synchronous motor 45 through suitable speed reduction gearing 46. The opposite end of the square shaft is supported by a disk 48 which has a matching square aperture in the center thereof for receiving said shaft. Forming part of a friction clutch, the disk 48 normally is clamped between a circular plate 49 and the face of a hub 50 which is keyed to the hollow shaft 34. The hub 50 has a shallow circular recess on the face thereof to receive the disk and maintain it centered, and around its rear margin it has a plurality of pockets housing spiral compression springs 52 which cooperate with shoulder bolts 53 to provide the disk-clamping action.

As will be noted from Figs. 1 and 3 a series of numbers and scale markings 56, indicative of the hours of the day, are imprinted on the periphery of the hub 50; part of these are visible through an aperture 57 in the cap 58 and together with a pointer 60 they serve as a clock to register the time of day.

A knob 61 is provided on clutch plate 49 whereby the plate may be drawn manually away from hub 50 against the tension of springs 52. This permits disk 48 to float freely on shaft 44 between the faces of plate 49 and hub 50 so that by rotating knob 61 the hub, hollow shaft 34 and roller 28 may be turned without rotating the square shaft 44 or motor 45. In other words, the driving mechanism may be temporarily disengaged for the purpose of setting the clock (56) and moving paper strip 27 correspondingly. When knob 61 is released the clutch is reengaged under the influence of springs 52 and the motor resumes driving the clock and strip in normal fashion.

Attention is directed to the fact that the driving mechanism described above may be removed as a unit from the casing of my device for purposes of servicing. In order to do this it is only necessary to remove knob 61 by loosening set screw 63, then remove the caps or covers 58 and 59 by loosening screws 64 and 65 (see Figs. 1 and 2) and finally to loosen screws 39 and 40. When this is done, the frame 36 may be moved leftwardly (Fig. 6), the clutch end of the unit being lowered enough to permit sprocket pins 29 to clear flange 38 in the course of such movement; the hub 50 will pass through aperture 68 in the right-hand wall 15 of the casing, and the whole unit can be withdrawn through aperture 69 in the left-hand wall. In reassembling the apparatus the process is reversed, the clutch end of the unit being inserted through aperture 69 and moved to the right through aperture 68 until frame 36 is in position to be secured again to the opposite walls 15 by screws 39 and 40.

The laterally extending hollow base portions 16 of the casing of my device serve as a housing for various pieces of electrical equipment which, taken individually, are of standard design and construction; these are identified by the same reference numerals in the structural figures as in the circuit diagram (Fig. 9) and their function will be explained in connection with the latter figure. (The actual wiring has been omitted from the structural figures for the sake of clarity.)

Referring now to Fig. 3, the paper strip 27 preferably is imprinted as shown, thereby to provide a wide center column 70 upon which handwritten notations may be made. To the right of the wide center column is an "hour" column 72, a "quarter hour" column 73, and two additional columns 74 and 75 which will be referred to hereinafter as the "announcer" and "actuator" columns, respectively. To the left of the wide center column is a narrower one, 77, preferably bearing legends indicative of the calendar date, the day of the week and also, at appropriate locations, "Noon" and "Midn't." The spacing of the numbers in the "hour" and "quarter hour" columns is so correlated with the speed at which the strip is advanced that pointer 78 always stands opposite the correct time. This pointer is carried by a shield 79 under which (and hence normally concealed from view) are two sets of metallic brushes 80 and 81 so tensioned that they engage the upper surface of the paper strip at points aligned with pointer 78. The brushes are mounted on an insulator 83, the left-hand set being disposed over the "announcer" column 74 and the right-hand set being disposed over the "actuator" column 75.

In practice, when an individual desires to be reminded of any matter at some future time he will write an appropriate memorandum in column 70 in the section allotted to the day on which he desires the matter to be brought to his attention and, more particularly, on the line opposite the desired hour of the day; at the same time he will draw a horizontal line 84 across the "announcer" column 74 at a point opposite the exact time he wishes the matter to be brought to his attention. This writing preferably is done with an ordinary pencil although electrically conductive ink may be employed if desired.

In the illustration, the notation "Call John Smith" is scheduled for 5:15 p. m. on Friday, August 6. At the scheduled time the notation will reach a position opposite pointer 78, and simultaneously the mark 84 drawn across the "announcer" column will complete an electrical circuit between brushes 80, which will cause lamp 85 to light intermittently, or will cause chime 103 to sound periodically, or both. The manner in which this is accomplished will be explained in connection with Fig. 9. A further notation then may be entered in column 70, if desired, to indicate what disposition of the scheduled matter has been made.

Referring to Fig. 9, 88 and 89 are electronic devices, the first of which is adapted to energize its associated relay 90 when a circuit is completed between brushes 80, and the latter of which is adapted to energize its associated relay 91 when a circuit is completed between brushes 81. These electronic devices receive current from the 110 volt source over conductors 93 and 96 and the connections indicated by dotted lines; their design forms no part of the present invention, but each conveniently may consist of a normally non-conductive grid-controlled tube having the associated electromagnetic relay in its plate circuit, the paper-engaging pick-up brushes being connected to the grid circuit of the tube to render same conductive responsive to a drop in the resistance between the brushes. A mark drawn with lead pencil or electrically conductive ink across the "announcer" column thus will trigger the tube and result in the operation of relay 90 for the period of time that the mark remains in contact with both brushes 80. The area of the paper engaged by the brushes preferably is such that, considering the speed at which the strip advances, a line of average thickness will complete the circuit between the brushes (and hence maintain relay 90 operated) for a period of about two minutes.

The operation of relay 90 completes an obvious motor circuit extending over conductor 93, contact 94, motor 95 and conductor 96, whereby motor 95 begins to rotate the commutators 97 and 98. At the same time, contact 94 also completes a circuit from conductor 93 over toggle switch 100, commutator 97 and the primary winding of step-down transformer 101 to conductor 96; and a second circuit from conductor 93 over toggle switch 102, commutator 98 and signal 103 to conductor 96. Accordingly, under control of commutator 98, chime 103 sounds at intervals of approximately 30 seconds, while under control of commutator 97, lamp 85 which is connected to the secondary winding of transformer 101 is flashed at intervals of approximately four seconds. Obviously, the intervals may be increased or decreased in length if desired by appropriate modification of the commutators.

The toggle switch 100 makes it possible conveniently to disable the visible signal 85 in the event the operator wishes to rely solely upon an audible signal; on the other hand the audible signal 103 may be disabled by opening the switch 102 if the operator wishes to rely solely on the visible signal.

When relay 90 restores to normal as a result of the mark 84 advancing beyond the brushes 80, contact 94 opens, thereby halting motor 95 and interrupting the circuits for both the visual and the audible signal. As pointed out hereinbefore, a mark of average thickness remains in contact with the brushes for about 2 minutes, and accordingly the signalling period is of approximately two minutes duration. If it is desired to prolong this period, the mark may be made thicker in the direction of movement of the strip, or, alternatively, a pair of vertical lines 104 (see Fig. 3) may be so drawn that they will be engaged by the respective ones of the brushes, these vertical lines being connected by one or more cross lines (to complete the conductive path between the brushes) whereby the lines form a U, an inverted U, an H, an N or a rectangle, for example. The U drawn in Fig. 3 for illustrative purposes would result in continuous signalling for a period of one hour, i. e., from 9 p. m. until 10 p. m. on August 6, or until the switches 100 and 102 were operated to disable the signals.

A remote audible or visual signal (or any desired other electrical device) is adapted to be connected to the machine by means of conductors 122, plug 123 and jack 124, and when thus connected will be operated for the duration of the signalling period under control of contact 94.

Let it now be supposed that a mark 105 has been drawn across the "actuator" column 75 as shown in Fig. 3. When it reaches brushes 81, relay 91 will be energized as explained hereinbefore and then, after an interval of approximately 2 minutes, the relay will restore to normal as a result of the mark passing beyond the brushes. Upon energization of relay 91, contact 106 closes thereby completing an obvious circuit extending from conductor 93, over contact 106 and winding 107 of a stepping switch, back to conductor 96. The switch winding thereupon energizes and by attracting the armature 108 rotates the insulated cam 109 through 45° and hence closes contact 110.

Contact 110 upon closing completes a circuit from conductor 93 over the primary winding of step-down transformer 112 to conductor 96 thereby steadily lighting lamp 113 which is connected to the secondary winding of the transformer. It also connects conductor 93 to the lower spring of jack 114, the upper spring of this jack being connected to conductor 96 as shown. Accordingly any remote electrical device which has been connected to the jack by means of plug 115 and conductors 116 also will be energized. This device may be, for instance, a heater, a blower, a radio, a time lock, refrigeration equipment or a refrigerator defrosting device, an electrical sign or sign flasher, a generator, a circuit breaker, fire protective apparatus, laboratory equipment, or in fact any electrical device which it may be desired to control on a time basis.

Now, when relay 91 de-energizes as a result of mark 105 advancing beyond brushes 81 contact 106 will open the circuit for stepping switch magnet 107 whereupon its armature 108 returns to normal. Cam 109 maintains contact 110 closed, however, (ratchet wheel 117 being provided with a holding pawl, not shown, which prevents retrograde movement) and hence lamp 113 and the remote device plugged into jack 114 remain energized.

This condition will prevail until another line 118 drawn across the "actuator" column reaches the brushes 81. When this occurs relay 91 is reoperated and brings about the reenergization of switch magnet 107, thus advancing cam 109 another step; accordingly contact 110 is opened, extinguishing the light 113 and de-energizing the remote apparatus which has been plugged into jack 114.

From the above explanation it will be seen that the light 113 and the remote apparatus remain energized throughout the period represented by the distance between marks 105 and 118, the mark 105 serving to turn them on and the mark 118 serving to turn them off. The next mark in the "actuator" column to reach brushes 81 (i. e., mark 119) will turn these devices on again, while the succeeding mark (120) will turn them off. In other words, considering a succession of marks in the "actuator" column, alternate ones of the marks serve to turn on the light 113 and the remote device, while the intervening marks turn them off. The exact time at which each of these changes takes place is governed by the location of the marks relative to the time scale provided in columns 72 and 73. Thus, the apparatus in effect impresses upon conductors 116 an alternating current impulse whose beginning and ending, determined by successive trigger marks in the "actuator" column, may be spaced in time with complete freedom, making possible an impulse or operational period which may be minutes long, hours long, weeks long or even months long. The spacing between successive impulses or operational periods has the same infinite flexibility. Whether the remote device is in operated or nonoperated condition is always apparent, of course, by whether or not lamp 113 is lighted.

It sometimes may happen, after lamp 113 and the remote apparatus have been turned on, that it is desired to turn them off immediately without waiting for another mark in the "actuator" column to reach brushes 81; on the other hand, it may be desired at times to turn them on immediately without waiting for a mark to reach brushes 81. For this purpose a self-restoring or non-locking push button switch 121 has been provided. Momentary operation of the switch 121 completes a circuit from conductor 93 over the switch and winding 107 of the stepping switch magnet to conductor 96, thereby causing the switch to close contact 110 if it previously was opened, or to open contact 110 if it previously was closed. Hence, by means of push button 121, lamp 113 and the remote apparatus connected to jack 114 may be energized or de-energized at will without affecting the operation of the strip-advancing mechanism and without in any way altering the position of the paper strip; after such a change, the next mark on the "actuator" column to reach brushes 81 will function in the normal way to reverse the status of lamp 113 and the remote equipment as brought about by the push button operation.

Considering further the control functions brought about with respect to remote electrical equipment connected to my machine by a jack 114, plug 115 and conductors 116, attention is directed particularly to the fact that this control may be cyclic or non-cyclic in character depending upon the spacing and relationship of the trigger marks in the "actuator" column 75. In other words, remembering that each operational period of the remote equipment is governed by an alternating current impulse impressed on conductors 116, and considering the time pattern of the successive impulses impressed on conductors 116 in the course of a year it will be seen that there may be, as the result of the spacing of the marks on the strip, a regularly spaced recurrence of the beginning and/or ending of the impulses on, say, an hourly basis; or there may be a dissimilarity between the impulse pattern in one hour and that in another hour, but a recurrence of the overall pattern on, say, a daily basis; or perhaps the most frequent recurrence of the pattern is weekly, or monthly; or there may be no recurrence of the pattern at all in the course of a year.

This complete flexibility in determining the program of the remote device results from the fact that the year-long control strip is layed out in such a way that each ruled-off horizontal space represents not one hour in a 24-hour cycle, nor one hour in a 7-day cycle, but rather one hour which is unique and never to be repeated and which has a fixed position with respect to every other hour in the year-long time span.

Although only a single "actuator" column 75 has been shown, it will be obvious that the strip 27 can be made wider and provided with additional "actuator" columns parallel to the one shown, each of the additional columns being adapted to control a separate remote device over other outgoing conductors like 116 in a manner similar to that described for "actuator" column 75. Should a plurality of "actuator" columns or channels be provided, it also will be evident that the program set up in each column may have the same flexibility as discussed above, so, for example, an hourly cycle can be established for one remote device, a weekly cycle for another, a non-recurring program for still another and so on; further, a single remote device or group of devices can be controlled conjointly by two or more actuator columns, but the apparatus for doing this forms no part of the present invention.

By the use of multiple "actuator" columns or channels my machine is suitable for supplying an integrated and coordinated, long-time control over complex systems of transportation, communication, power distribution and industrial operation, to cite but a few examples. In connection with multiple "actuator" channels, the hand autographed notations in column 70 assume special importance in indicating the significance of the triggering marks in the various "actuator" columns.

Certain other modifications will be obvious to those versed in the art. Light-sensitive tubes or other devices can be employed in place of the brushes 80 and 81 for sensing the strip, for instance. Also, instead of inscribing trigger marks on the strip, adhesive patches of thin conducting material or light-reflecting material or other activating material may be secured to the strip; assuming that such a patch is attached in the "announcer" column 74, it will be seen that the length of the patch in the direction of the movement of the strip 27 will determine the length of the signal period.

Referring now to Fig. 8 which shows how the strip 27 is accordion folded and stored in the forward tray 21, attention is directed to the fact that the section of the strip between the crease 125 and the crease 126 covers the 12-hour daylight period extending from 8 a. m. to 8 p. m. on August 7. The immediately succeeding 12-hour portion of the strip (i. e., that covering the night hours from 8 p. m. of August 7 to 8 a. m. of August 8) normally occupies a position face down in the tray, and the next section disposed face up in the tray is the one devoted to the daylight hours extending from 8 a. m. to 8 p. m. on August 8.

In other words, the transverse creases divide the strip into sections each covering 12 hours, these sections being accordion folded in the tray 21 so the sections representative of night hours are face down. Although the creases preferably are formed on the 8 o'clock lines as shown, this is not essential, it being obvious that the strip may be creased instead on the 6 o'clock lines, the 7 o'clock lines, the 9 o'clock lines or any other pair chosen.

Each 12-hour section of the strip is dated, the date being imprinted in the left-hand column just above the crease which defines the bottom or trailing edge of that section. Therefore, when the strip is folded in the tray 21 the dates appear in the lower left-hand corner of the "face up" sections making it easy to locate any desired date without removing the strip from the tray. Assume, for instance, that on August 6 it is desired to schedule an event for 30 days hence. The lid or door 20 first is opened by rotating it up and back until it rests on the edges of walls 15. This gives access to the forward tray and more particularly to the pack of folded strip-sections stored therein, the lower edge of the pack being exposed through the slot 127 in the wall of the tray. By means of this exposed edge the pack may be separated at any level, the sheets in the upper portion of the pack being bent back slightly to permit inspection of the date imprinted in the lower left-hand corner of the sheet situated at the separation level. Further, by allowing the edges of the sheets in the raised portion of the pack to ripple from his fingers back to their normal position the operator may very rapidly scan the lower left-hand corners of a succession of sheets in order quickly to locate the sheet bearing the desired date.

Having found this, he will enter the written memorandum on the proper hour-line of the selected sheet and make a mark in the "announcer" column 74 and/or the "actuator" column 75, as explained hereinbefore. More specifically, bearing in mind that the entry is to be made at an intermediate level in the pack and that this level has been located, the portion of the pack above the desired level is folded completely back so that it may be layed temporarily on the inner surface of the open cover 20. Thus, the section of the paper strip devoted to the 12 daylight hours extending from 8 a. m. to 8 p. m. of the desired day is exposed on top of the layers in tray 21 while the section devoted to the next preceding 12-hour period (i. e., the night hours) is exposed on top of the bundle which now rests on the back of open cover 20. The memorandum and circuit triggering marks, therefore, may be entered conveniently at the proper place on either a "daylight" or "night" section of the strip, both of which are inclined at a comfortable writing angle. After the entry has been completed, the bundle on lid 20 is returned to its proper position on top of the pack in tray 21 and the cover or lid 20 is swung around to its closed position.

All of this is done, of course, without interrupting or affecting the operation of the machine in any way. Similarly, should it be desired for any reason to study the notations made on a portion of the strip covering a realtively long period of time, the strip in the forward or rear tray, as the case may be, may be unfolded and spread out on the table for inspection while the machine continues to run.

The strip 27 is made of such length as will cover any desired period of time, a period of six months or 12 months being preferred. A year-long strip, although several hundred feet in length, is easily accommodated by my machine and when arranged in accordion folds, as described above, every portion of the strip is instantly accessible for making notations thereon, for checking notations previously made or for erasing or otherwise making changes in the notations. Moreover, the desired portion of the strip may be located almost instantly by virtue of the date-indexed arrangement of the accordion folds in the storage tray, the dates imprinted thereon also serving, as the strip is drawn from storage and advance across table 17, to identify the current day and calendar date.

Actually, then, the forward tray 21 serves as a time-indexed file of memoranda and trigger marks pertaining to future matters, while the rear tray 25 serves as a time-indexed record of past memoranda and marks. During the transition in time from future to past, the significant portion of the strip becomes an exposed bulletin of current matters, and the previously entered trigger marks become operative to bring about their intended signal and control functions.

From the foregoing it will be seen that this invention is one well adapted to attain all of the ends and objects hereinbefore set forth together with other advantages which are obvious and which are inherent to the apparatus.

It will be understood that certain features and subcombinations are of utility and may be employed without reference to other features and subcombinations. This is contemplated by and is within the scope of the claims.

Inasmuch as many possible embodiments and uses of the invention may be made without departing from the scope thereof, it is to be understood that all matter herein set forth or shown in the accompanying drawings is to be interpreted as illustrative and not in a limiting sense.

Having thus described my invention, I claim:

1. In combination, a primary frame having a pair of spaced-apart walls, a secondary frame bridging the space between said walls and removably secured at its opposite ends to the walls, a cylindrical roller rotatably mounted on said secondary frame so it is positioned between said walls with its axis substantially normal thereto, a motor mounted on said secondary frame so one of said walls is between said motor and said roller, a drive connection between the motor and the roller, said one wall having an aperture through which said secondary frame is adapted to pass with said motor and roller mounted thereon when said secondary frame is detached from the walls.

2. In combination, a primary frame having a pair of spaced-apart walls, a secondary frame bridging the space between said walls and removably secured at its opposite ends to the walls, a cylindrical roller rotatably mounted on said secondary frame so it is positioned between said walls with its axis substantially normal thereto, a motor mounted on said secondary frame so one of said walls is between said motor and said roller, means including a clutch for detachably connecting said motor to said roller to drive same, the other of said walls being disposed between said roller and said clutch, said other wall having an aperture through which said clutch is adapted to pass when said secondary frame is detached from said walls, and said one wall having an aperture through which said secondary frame is adapted to pass with said motor, roller and clutch mounted thereon when said secondary frame is detached from said walls.

3. In combination a primary frame having a pair of spaced-apart walls, a secondary frame bridging the space between said walls and removably secured at its opposite ends to the walls, a cylindrical roller rotatably mounted on said secondary frame so it is positioned between said walls with its axis substantially normal thereto, a motor mounted in said secondary frame, means including a clutch for detachably connecting said motor to said roller to drive same, one of said walls being disposed between said roller and said clutch, said one wall having an aperture through which said clutch is adapted to pass when said secondary frame is detached from said walls.

RUSSELL D. SCHNEE.

REFERENCES CITED

The following references are of record in the file of this patent:

UNITED STATES PATENTS

| Number | Name | Date |
|---|---|---|
| 1,137,427 | Schaff | Apr. 27, 1915 |
| 1,664,568 | Metzner | Apr. 3, 1928 |
| 1,761,558 | Brand | June 2, 1930 |
| 1,808,167 | Hicks | June 2, 1931 |
| 1,865,394 | Schultz | June 28, 1932 |
| 1,871,212 | Cooke | Aug. 9, 1932 |
| 1,983,759 | Houston | Dec. 11, 1934 |
| 2,072,134 | Sherman | Mar. 2, 1937 |
| 2,109,535 | Jones | Mar. 1, 1938 |
| 2,193,759 | Birr | Mar. 12, 1940 |
| 2,229,100 | Lapsley | Jan. 21, 1941 |
| 2,384,358 | Widell | Sept. 4, 1945 |
| 2,482,615 | Fowler | Sept. 20, 1949 |

FOREIGN PATENTS

| Number | Country | Date |
|---|---|---|
| 185,755 | Germany | Apr. 29, 1907 |